United States Patent
Andres et al.

(10) Patent No.: US 7,643,921 B2
(45) Date of Patent: Jan. 5, 2010

(54) CLIPPED SENSOR DATA ESTIMATOR

(75) Inventors: Robert M. Andres, Clarkston, MI (US); Douglas A. McConnell, Rochester Hills, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 497 days.

(21) Appl. No.: 11/212,893

(22) Filed: Aug. 26, 2005

(65) Prior Publication Data

US 2006/0052925 A1 Mar. 9, 2006

Related U.S. Application Data

(60) Provisional application No. 60/607,403, filed on Sep. 3, 2004.

(51) Int. Cl.
  *G01P 15/04* (2006.01)
  *G06F 19/00* (2006.01)
  *G01C 25/00* (2006.01)
  *G01D 18/00* (2006.01)

(52) U.S. Cl. .............................. 701/47; 701/34; 701/35; 701/70; 702/66; 702/104; 702/141

(58) Field of Classification Search .................. 701/34, 701/35, 47, 70
  See application file for complete search history.

(56) References Cited

U.S. PATENT DOCUMENTS

| 4,112,499 | A | * | 9/1978 | Mangum et al. | ............ 708/443 |
|---|---|---|---|---|---|
| 4,243,248 | A | * | 1/1981 | Scholz et al. | ............... 280/735 |
| 4,637,050 | A | * | 1/1987 | Schradin | ..................... 381/94.6 |
| 4,710,809 | A | * | 12/1987 | Ries et al. | .................... 348/144 |
| 5,420,516 | A | * | 5/1995 | Cabot | ......................... 324/620 |
| 5,532,944 | A | * | 7/1996 | Battista | ........................ 708/3 |
| 6,053,584 | A | * | 4/2000 | Schunck et al. | ............. 303/167 |
| 6,255,962 | B1 | * | 7/2001 | Tanenhaus et al. | ..... 340/870.05 |
| 6,460,882 | B1 | * | 10/2002 | Andres | ....................... 280/735 |
| 6,629,049 | B2 | * | 9/2003 | Hirata | ......................... 702/70 |
| 7,248,987 | B2 | * | 7/2007 | Sugiura | ..................... 702/117 |
| 2002/0032536 | A1 | * | 3/2002 | Hirata | ......................... 702/70 |
| 2003/0023360 | A1 | * | 1/2003 | McConnell | .................. 701/45 |

OTHER PUBLICATIONS www.denoise.net "Clipping restoration" http://sound.eti.pg.gda.pl/denoise/clipping.html © 2004 Multimedia Systems Department, Gdansk University of Technology and Air Force Academy in Deblin. 2 Pages. Downloaded: Jul. 5, 2008 5:27:37 PM.*
Roger W. Lockhart, DATAQ Instruments, Inc. A Closer Look At The WINDAQ Derivative Algorithm. 5 Pages. Downloaded from: http://web.archive.org/web/20020224224111/http://dataq.com/applicat/articles/an12.htm. on Jul. 6, 2008. Date last edited Dec. 20, 2001.*

* cited by examiner

*Primary Examiner*—Eric Bolda
*Assistant Examiner*—Ari M. Diacou

(57) ABSTRACT

A method of estimating values beyond sensor limits accurately and simply includes the initial step of determining an actual slope utilizing measured data. An estimated slope is then determined as a percentage of the actual slope to provide an estimation of data values outside of the sensor limits until measured values return to within sensor limits. The estimation method according to this invention increases sensor range without sacrificing resolution with a desired accuracy.

10 Claims, 3 Drawing Sheets

CLIPPED SENSOR DATA ESTIMATOR

CROSS REFERENCE TO RELATED APPLICATION

The application claims priority to U.S. Provisional Application No. 60/607,403 which was filed on Sep. 3, 2004.

BACKGROUND OF THE INVENTION

This invention generally relates to a method of estimating data beyond a clipped range of a sensor. More particularly, this invention relates to a method of utilizing data within sensor range for estimating data outside of sensor range.

Motor vehicle occupant restraint systems utilize sensors to distinguish between events that require deployment and events that do not require deployment. An acceleration sensor is one type of sensor utilized. Acceleration sensors are designed with a predetermined range and resolution. Typically the greater the range, the lower the resolution. As appreciated, different ranges and resolutions are required for reliably detecting different vehicle events. For example, an acceleration sensor with a high range and a low resolution is preferred to determine impact events. However, a low range, high resolution acceleration sensor is best for detecting and discerning other driving conditions.

Disadvantageously, it is expensive and not practical to include several acceleration sensors with differing ranges and resolutions along with the supporting hardware and software within a vehicle. Accordingly, sensors having a middle ground range and resolution have been used to perform more than one function. The resulting performance is not desirable due to the limited range. Acceleration values outside of sensor range are simply clipped, meaning not recorded. Data is simply unavailable beyond the sensors range. Further, the resolution suffers as a sacrifice to increased range. The trade off between resolution and range therefore provides less than desirable performance.

Accordingly, it is desirable to develop a method of increasing the range of a sensor beyond sensor limits without sacrificing resolution.

SUMMARY OF THE INVENTION

An example method according to this invention estimates values beyond sensor limits accurately and simply by utilizing measured values from a sensor to estimate values beyond the sensor limits.

Sensors typically are selected for a desired resolution and range. The range and resolution typically counteract each other such that a sensor with a large range will have a lower resolution, and a sensor with a greater resolution will have a smaller range. Therefore, an example method according to this invention estimates values outside of the sensor range, providing for the use of a single sensor for several unique sensor applications.

The estimation method includes the step of utilizing points within the sensor limits to determine a slope value. A percentage of the determined slope is then utilized to estimate values outside the clipped limits. The magnitude of values outside the sensor range may be limited as is required for a specific application.

Accordingly, the example method according to this invention provides estimation of values outside of sensor range in an accurate and easily applied manner.

These and other features of the present invention can be best understood from the following specification and drawings, the following of which is a brief description.

DETAILED DESCRIPTION OF THE PREFERRED EMBODIMENT

Figure 1:
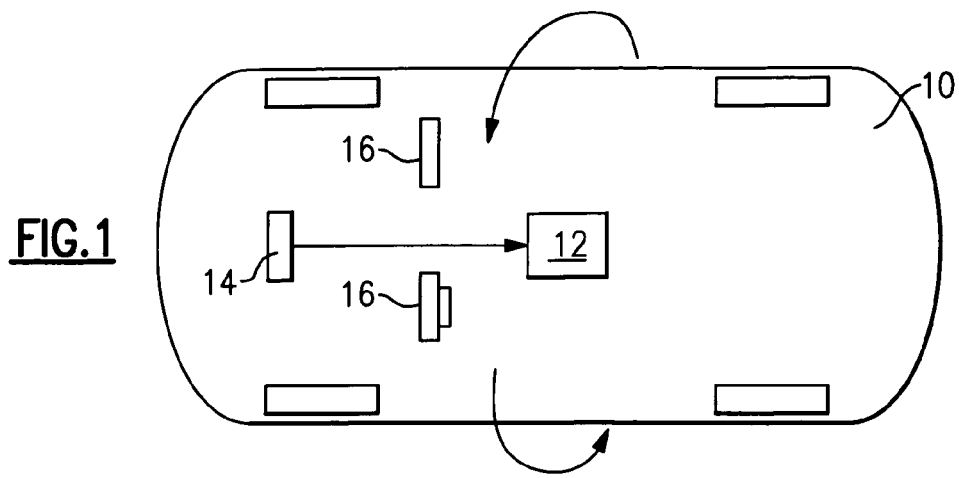
FIG. 1 is a schematic illustration of a motor vehicle.

Referring to FIG. 1 a motor vehicle 10 is shown including a controller 12 and an acceleration sensor 14. The acceleration sensor 14 is used to initiate actuation of an occupant protection system 16, such as an airbag, for example. The occupant protection system 16 is initiated in response to an event as indicated by an acceleration measurement within defined criteria.

The occupant protection system 16 utilizes the acceleration sensor 14 for discriminating between events that require deployment and other events that do not require deployment of the system 16. Although, the method is described in reference to an acceleration sensor for an occupant protection system 16, other sensors for measuring other vehicle operations will benefit from this invention.

An acceleration sensor, along with other types of sensors typically is selected for a desired resolution and range. The range and resolution typically counteract each other such that an acceleration sensor with a large range will have a lower resolution, and a sensor with a greater resolution will have a smaller range. Acceleration sensors for sensing larger ranges typically do not require the greater resolution in the higher portions of the range, and require greater resolution in the lower values of the range. However, acceleration sensors are typically constructed with a resolution that is fixed throughout the entire range.

Low range, high-resolution sensors are typically best for detecting low speed vehicle operating conditions. Other events may require an acceleration sensor with a greater range. Including separate sensors for each range is expensive and requires additional supporting hardware and software algorithms. Further, data outside of a sensor range is clipped; that is data simply is not measured until such time as the measured actual reading changes to a level that is back within the acceleration sensor range. The method of this invention provides for the use of lower range sensors by estimating data outside of the sensors range with desired accuracy.

Figure 2:
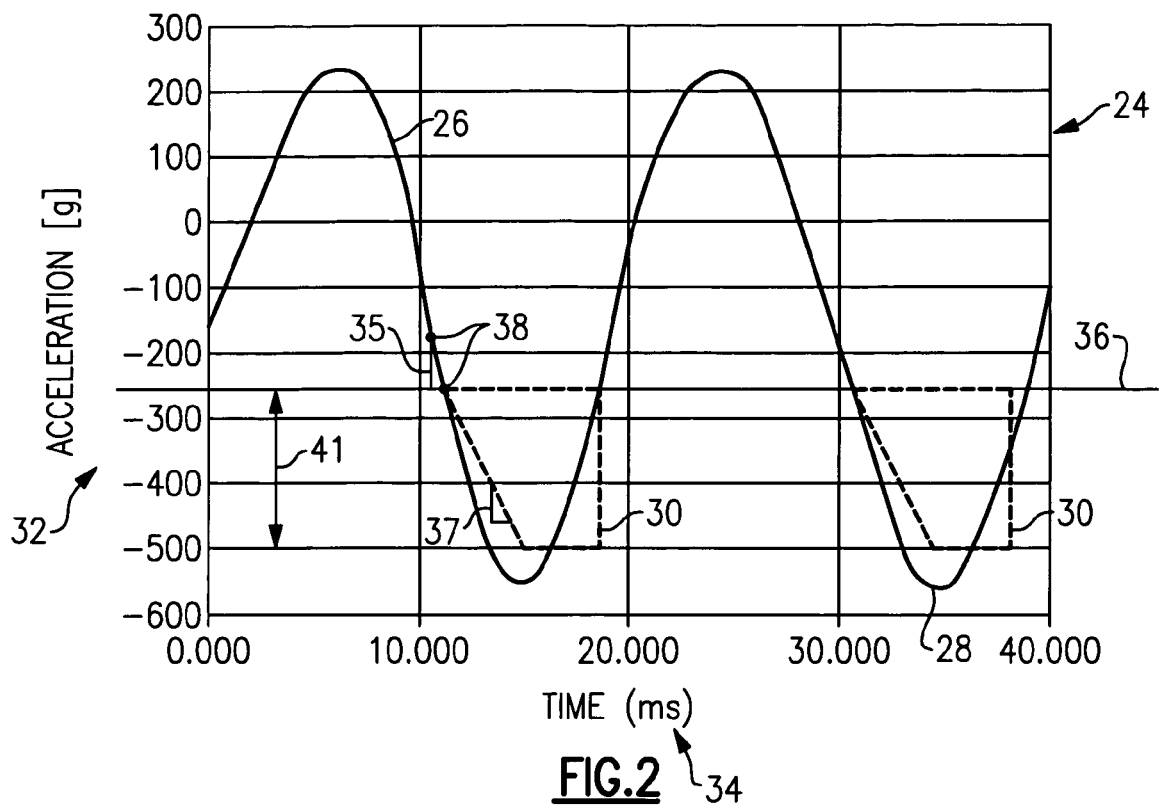
FIG. 2 is a graph illustrating example estimated values according to a method of this invention.

Referring to FIG. 2, graph 24 shows an example acceleration sine wave to illustrate the method according to this invention. The acceleration values are measured above a lower clip limit 36. Below the lower clip limit 36, an estimated value 30 is determined by recording two points 38 within the sensor range to determine an actual slope 35. The actual slope 35 is utilized to determine an estimated slope 37 that is maintained past the lower clip limit 36 either to a desired limit value or until the actual measured value returns to within sensor range. The estimated slope 37 may be equal to the actual slope or may be some fraction of the actual slope 35 to tailor estimated values to application specific requirements. In this example the estimated slope 37 is a fraction of the actual slope 35 measured with actual measured data. Further, in this example, the lower clip limit is −250 g and the estimated acceleration value is limited to −500 g. As is shown the limit on the estimated value results in a squared off estimation that provides a desired estimation adequate for application specific requirements. The estimation limit may be different than this example to tailor the estimated sensor values to the specific application. Further, the estimated slope 37 may be modified to tailor the estimation to application specific requirements.

Utilizing the acceleration data actually provided by the acceleration sensor 14 can generate substantial inconsistencies in gathered data. In other words, without the estimating method according to this invention, the clipped acceleration data can compound to provide inaccurate data.

Figure 3:
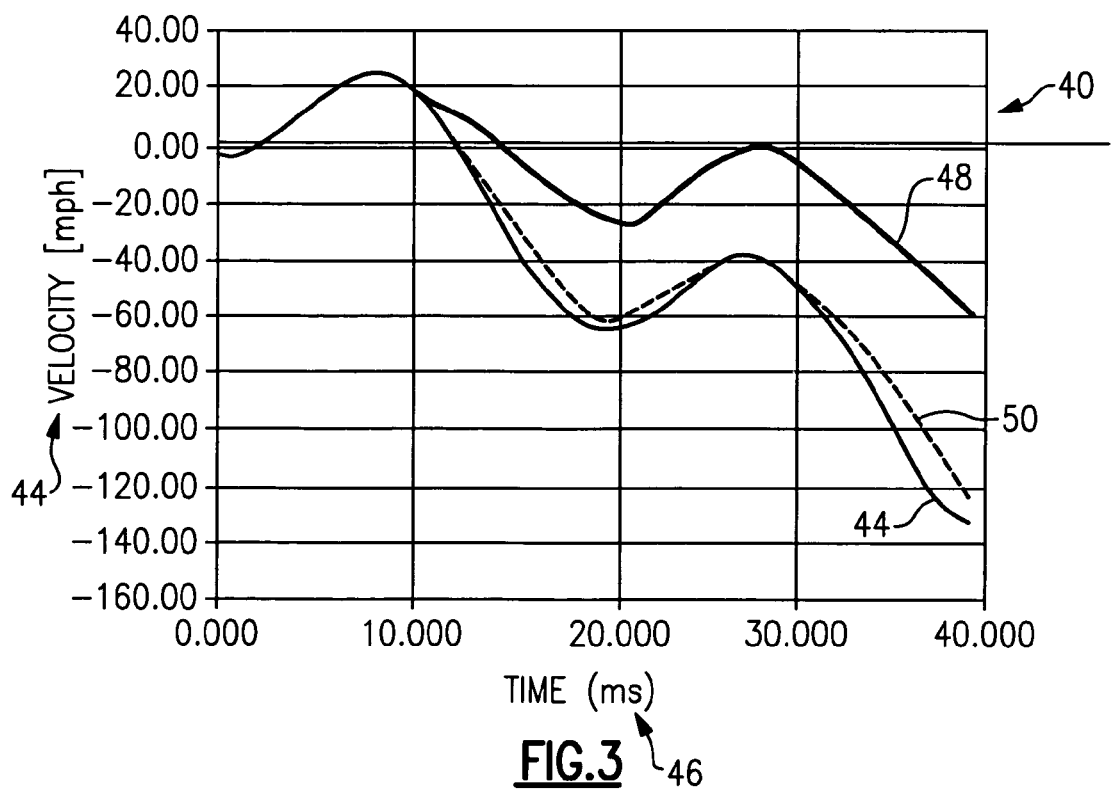
FIG. 3 is a graph illustrating example velocity values determined according to a method of this invention.

Referring to FIG.FIG. 3, an example of the inconsistencies that can be compounded by using actual instead of estimated acceleration data is illustrated in graph 40. The graph 40 shows velocity 44 in miles/hour relative to time 46 measured in milliseconds. The velocity is determined based on the accelerations measured and illustrated in FIG. 2. The velocity indicated at 44 is determined utilizing the actual acceleration profile 26 that includes the clipped portion 28. The velocity profile 48 is determined using the acceleration profile 26, without the clipped portion 28. In other words, the velocity profile is determined using only the data actually measured by the acceleration sensor 14, without the estimating method according to this invention. The velocity profile 50 is determined utilizing the estimated acceleration values along with the acceleration profile 26 above the lower clip limit 36. As is shown, the velocity profile 50 utilizing the estimated acceleration values is much closer to the actual velocity values 44. However, the velocity profile 48 using only data actually measured by the acceleration sensor 14 is significantly different than the actual value, thereby compounding the problems created by the lower clip limit 36.

Figure 4:
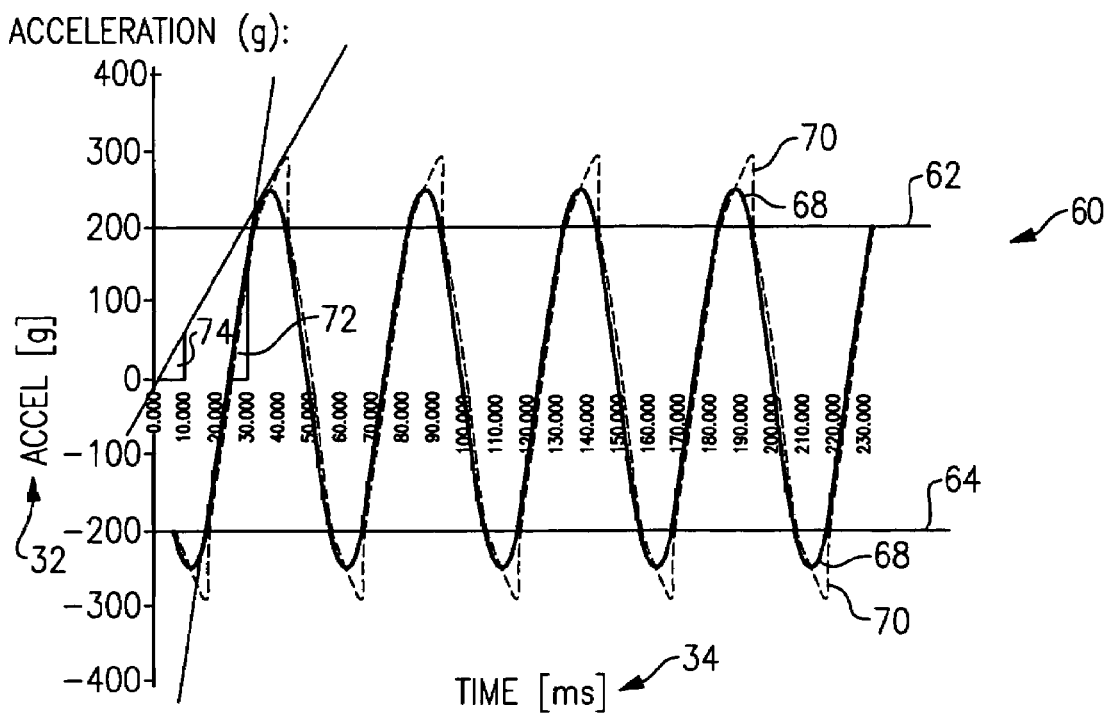
FIG. 4 is a graph of data gathered according to this invention.

Referring to FIG. 4, a graph 60 is shown illustrating another estimation method according to this invention in which an estimation limit has not been reached. The graph 60 illustrates actual data in this example, an actual slope 72 is determined utilizing data gathered from the sensor. An estimated slope 74 is then derived as some percentage of the actual slope 72. In this case, the estimate slope 74 utilized is 50% of the actual slope 72. As appreciated, other percentages can be utilized as is required to tailor estimated data to application specific requirements. Because no upper estimation limit has been reached, the estimated data 70 continues along the estimated slope 74 until such time as data from actual sensor measurements is received. The resulting estimated data approximates a right triangle that provides an estimation with a desired accuracy. Adjustment to the percentage provides for tailoring of the estimated slope 74 to a specific application.

Figure 5:
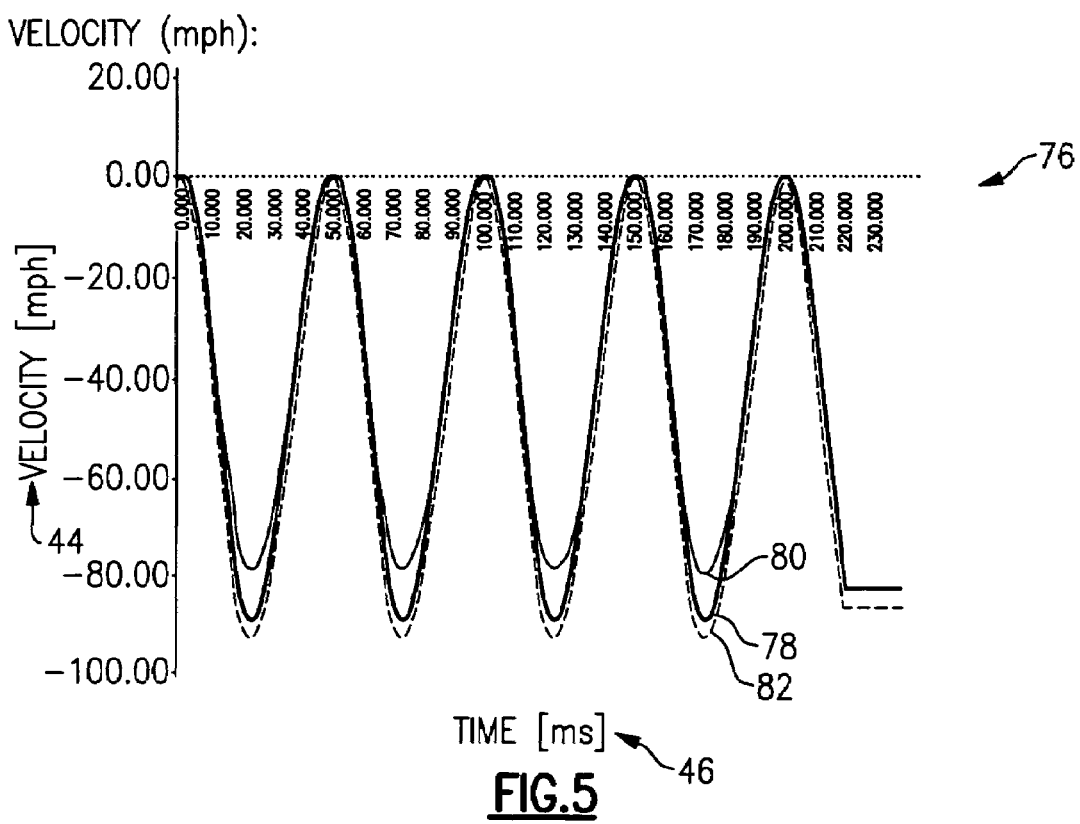
FIG. 5 is a graph of a graph of velocity data according to this invention.

Referring to FIG. 5, graph 76 illustrates an actual velocity 78 determined utilizing actual acceleration 68. A clipped velocity 80 is determined utilizing only the measured acceleration values, and an estimated velocity 82 is determined utilizing the estimated acceleration data 70. The estimated velocity 82 compares better than velocity determined using only acceleration values that are within the limits 62, 64 (FIG. 4). Accordingly, the estimated values provide a greater level of accuracy than utilization of actual values without estimation.

Figure 6:
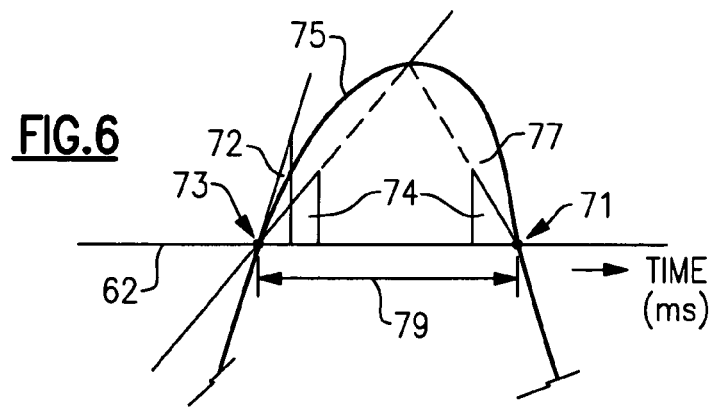
FIG. 6 is a schematic illustration of another data estimation method according to this invention.

Referring to FIG. 6, another method according to this invention is schematically shown and includes an actual data value 75 and an estimated value 77. The actual value 75 is not measured as it is above the upper sensor limit 62. In this example method, the estimated value is determined after the actual value 75 falls back below sensor limit 62. The estimated value 77 is then determined symmetrically within the time that data values were above the sensor limit 62. The determination of the estimated value 77 is determined after a delay period equal to or greater than the time 79. The estimated value 77 is determined utilizing the estimated slope 74 that is some percentage of the actual slope 72 determined utilizing actual measured data. This method then provides a symmetrical estimated value that closely approximates the actual data 75.

Determination of the estimated value 77 according to this method requires a short delay as shown for the actual data values to return to within sensor limits. This differs from the other example methods disclosed herein that determines estimated values on a substantially real time basis. Accordingly, the method illustrated by FIG. 6 provides an estimation method utilizing the actual measured slope 72 to provide a symmetrical ascending and descending estimation values.

Figure 7:
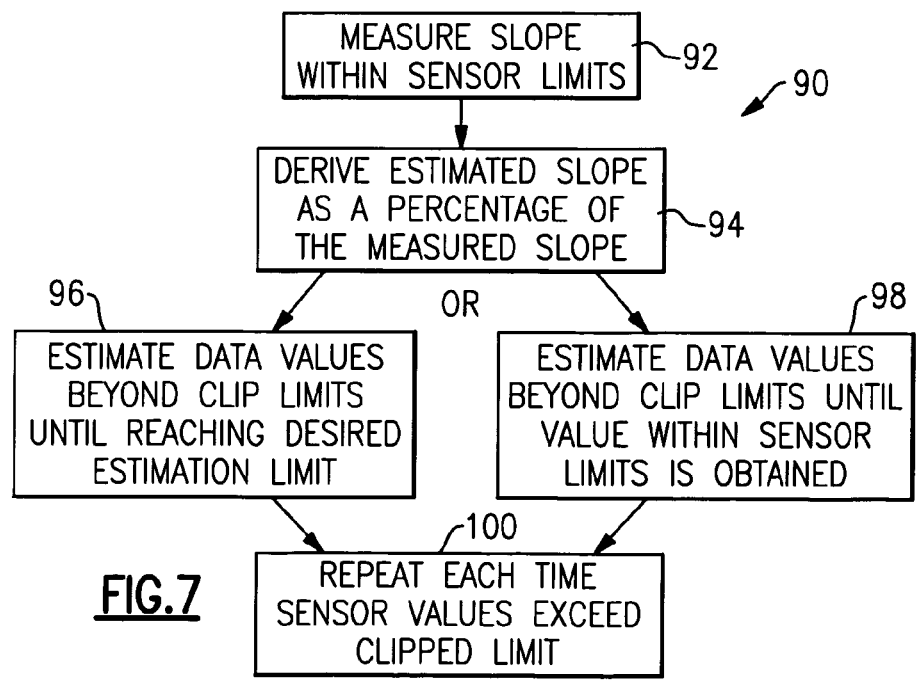
FIG. 7 is a block diagram of steps for the method of this invention.

Referring to FIG. 7, steps of the example methods according to this invention are shown schematically at 90 and includes the initial step indicated at 92 of determining an actual slope within the sensor limits. The slope determined from data within the sensor limits is then utilized to derive an estimated slope of data values outside of the sensor limits as is indicated at 94. The estimated slope is some desired percentage of the determined slope as is required to provide desired accuracy and reliability for a desired application. In one example embodiment of this method, the desired percentage is 50% of the actual slope. The specific percentage utilized may be modified to accommodate application specific data gathering requirements.

In one example method, the magnitude of estimated values is limited to a desired estimation limit as indicated at 96. Therefore, the determined slope is maintained outside of sensor limits until reaching the desired estimation limits. The limit of the estimated acceleration values will be tailored to the specific application. In another example method according to this invention the estimated slope is simply maintained until such time as actual measured values fall within the sensor limits as is indicated at step 98. In such an example method the estimated values simply stop once a measured value is within sensor limits. Simple stopping of estimated values simplifies data acquisition and any accompanying programming. Regardless of whether or not estimation limits are utilized or not, the process of determining an actual slope from measured data, and then deriving an estimated slope beyond sensor limits is repeated each time measured data values exceed sensor limits.

The example estimation method according to this invention provides for the simple and accurate estimation of values outside sensor range without complex algorithms or programming. Further, the example estimation methods disclosed herein provides for an increase in sensor range beyond sensor limits without sacrificing resolution and with a desired level of accuracy.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of estimating values outside of sensor limits comprising the steps of:
   a. determining an actual slope from measured data values indicative of vehicle operation within sensor limits;
   b. determining an estimated slope based on the actual slope;
   c. estimating data values outside of the sensor limit based on the estimated slope, wherein the estimated slope is determined as a percentage of the actual slope that is less than 100% of the actual slope and the estimated data values are determined until an actual measured data value fails within sensor limits,
   d. indicating a first condition in response to the measured data value being within a first range within the sensor limits;
   e. indicating a second condition in response to the estimated data value being within a second range outside of the sensor limits; and
   f. transmitting a signal indicative of one of the first and second conditions for use by a system.

2. The method as recited in claim 1, wherein data values are estimated according to the estimated slope until reaching a desired limit value.

3. The method as recited in claim 1, wherein the estimated slope is approximately 50% of the actual slope.

4. The method as recited in claim 1, wherein the estimated slope includes only an increasing portion that ends upon the measurement of a measured data value within the sensor limits.

5. The method as recited in claim 1, wherein the estimated slope is determined on a substantially real time basis.

6. A method of obtaining data beyond sensor limits comprising the steps of:
   a. determining an actual slope from measured data values indicative of vehicle operation within sensor limits;
   b. determining an estimated slope based on the actual slope, wherein the estimated slope is a percentage of the actual slope that is less than the 100% of the actual slope;
   c. estimating data values outside of the sensor limit responsive to the measured data values being beyond sensor limits based on the estimated slope until a subsequent measured data value within sensor limits is measured;
   d. indicating a desired condition in response to one of the measured data value and the estimated data value being within a desired range; and
   e. transmitting a signal indicative of the desired condition to an occupant protection system.

7. The method as recited in claim 6, wherein the desired condition comprises a first condition determined responsive to a measured data value being within a first range that is within the sensor limits.

8. The method as recited in claim 7, including a second condition determined responsive a second condition determined responsive to an estimated data value being within a second range beyond the sensor limits.

9. The method as recited in claim 6, wherein the estimated slope includes only an increasing portion that ends upon the measurement of a measured data value within the sensor range.

10. The method as recited in claim 6, wherein the estimated slope is determined on a substantially real time basis.

* * * * *

UNITED STATES PATENT AND TRADEMARK OFFICE
CERTIFICATE OF CORRECTION

PATENT NO. : 7,643,921 B2  Page 1 of 1
APPLICATION NO. : 11/212893
DATED : January 5, 2010
INVENTOR(S) : Andres et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 662 days.

Signed and Sealed this

Twenty-first Day of December, 2010

David J. Kappos
*Director of the United States Patent and Trademark Office*